US012691508B2

(12) United States Patent
Chang

(10) Patent No.: US 12,691,508 B2
(45) Date of Patent: Jul. 28, 2026

(54) MACHINING TOOL FOR BOX-END WRENCH AND METHOD OF MACHINING BOX-END WRENCH BY USING THE SAME

(71) Applicant: Chih-Min Chang, Changhua County (TW)

(72) Inventor: Chih-Min Chang, Changhua County (TW)

( * ) Notice: Subject to any disclaimer, the term of this patent is extended or adjusted under 35 U.S.C. 154(b) by 393 days.

(21) Appl. No.: 18/498,742

(22) Filed: Oct. 31, 2023

(65) Prior Publication Data

US 2024/0399474 A1 Dec. 5, 2024

(30) Foreign Application Priority Data

Jun. 5, 2023 (TW) .................................. 112120905

(51) Int. Cl.
B23C 5/12 (2006.01)
B23C 5/00 (2006.01)
(Continued)

(52) U.S. Cl.
CPC ................ B23C 5/006 (2013.01); B23C 5/12 (2013.01); B23D 43/02 (2013.01); B21D 28/243 (2013.01);
(Continued)

(58) Field of Classification Search
CPC ..... B23C 5/006; B23C 5/12; B23C 2210/285; B23C 2210/50; B23C 2220/08; B23C 2220/36; B23C 2220/605; B23D 37/10;

B23D 37/22; B23D 41/04; B23D 43/00; B23D 77/00; B23D 77/10; B23D 2043/025; B23D 2277/76; B23D 43/02;
(Continued)

(56) References Cited

U.S. PATENT DOCUMENTS 1,739,220 A * 12/1929 Forberg ................. B23D 43/02
407/18
1,806,552 A * 5/1931 Atwood ................. B23D 43/02
407/16
(Continued)

FOREIGN PATENT DOCUMENTS

CN 202539676 U * 11/2012
CN 204221108 U * 3/2015
(Continued)

*Primary Examiner* — Jermie E Cozart
(74) *Attorney, Agent, or Firm* — MUNCY, GEISSLER, OLDS & LOWE, P.C.

(57) ABSTRACT

A machine tool includes a fixed pillar, a finishing cutting tool with a first teeth portion, a rough cutting tool with a second teeth portion, a punching tool with a third teeth portion, and a support member passing through the punching tool, the rough cutting tool, and the finishing cutting tool and detachably mounted to the fixed pillar. The finishing cutting tool, the rough cutting tool, and the punching tool are arranged sequentially in a direction away from the fixed pillar. The outer diameter of the fixed pillar is smaller than the diameter of the finishing cutting tool. The diameter of the finishing cutting tool is greater than the diameter of the rough cutting tool. The diameter of the rough cutting tool is greater than the diameter of the punching tool. A method is also provided for machining a box-end wrench using the machining tool.

6 Claims, 5 Drawing Sheets

(51) Int. Cl.

| | |
|---|---|
| *B23D 43/02* | (2006.01) |
| *B21D 28/24* | (2006.01) |
| *B21D 28/34* | (2006.01) |
| *B21D 35/00* | (2006.01) |
| *B23D 43/00* | (2006.01) |
| *B23D 77/10* | (2006.01) |
| *B26F 1/14* | (2006.01) |
| *B26F 1/40* | (2006.01) |

(52) U.S. Cl.
CPC .......... *B21D 28/343* (2013.01); *B21D 35/001* (2013.01); *B23C 2210/285* (2013.01); *B23C 2210/50* (2013.01); *B23C 2220/08* (2013.01); *B23C 2220/56* (2013.01); *B23C 2220/605* (2013.01); *B23D 43/00* (2013.01); *B23D 2043/025* (2013.01); *B23D 77/10* (2013.01); *B26F 1/14* (2013.01); *B26F 2001/407* (2013.01)

(58) Field of Classification Search
CPC .. B21D 28/243; B21D 28/343; B21D 35/001; B26F 1/14; B26F 2001/407
See application file for complete search history.

(56) References Cited

U.S. PATENT DOCUMENTS

| | | | | |
|---|---|---|---|---|
| 2,041,759 A * | 5/1936 | Halborg | ................. | B23D 43/02 |
| | | | | 407/18 |
| 2,209,025 A * | 7/1940 | Kaplan | ................. | B23D 43/02 |
| | | | | 407/18 |
| 3,799,030 A * | 3/1974 | Schubert | ............... | B23D 41/06 |
| | | | | 409/269 |
| 4,212,573 A * | 7/1980 | Fields | ................... | B23D 41/06 |
| | | | | 409/257 |
| 2018/0071842 A1* | 3/2018 | Herrero | ................. | B21D 28/34 |

FOREIGN PATENT DOCUMENTS

| | | | | | |
|---|---|---|---|---|---|
| DE | 102009016939 A1 * | 10/2009 | ............ | B23D 43/04 |
| EP | 1477255 A1 * | 11/2004 | ............ | B23D 37/10 |
| FR | 548983 A * | 1/1923 | | |
| IT | TO20080717 A1 * | 4/2010 | ............ | B23D 43/02 |
| JP | 61020632 A * | 7/1984 | ............ | B23C 5/006 |
| TW | 1802233 B * | 5/2023 | | |
| WO | WO-2018180117 A1 * | 10/2018 | ............ | B23D 43/02 |

* cited by examiner

MACHINING TOOL FOR BOX-END WRENCH AND METHOD OF MACHINING BOX-END WRENCH BY USING THE SAME

BACKGROUND OF THE INVENTION

1. Field of the Invention

The present invention relates to box-end wrenches and more particularly, to a machining tool for machining a box-end wrench and a method of machining the box-end wrench by using the machining tool.

2. Description of the Related Art

A box-end wrench is a common hand tool. In actual use, a user fits the box-end wrench on a nut or bolt head and applies force to the handle of the box-end wrench, so that the user can lock and loosen the nut or bolt head in a more labor-saving way.

As shown in FIG. 1, as far as the traditional manufacturing method of the box-end wrench is concerned, a forging machine is used to machine a steel blank by using hot forging. The steel blank is pressed up and down through the male mold and the female mold to form a wrench blank 80, such that a top concavity 82, a bottom concavity 83 opposite to the top concavity 82, and a partition 84 located between the top concavity 82 and the bottom concavity 83 are formed at a machining end 81 of the wrench blank 80. Thereafter, a punching machine is used to punch the partition 84 so that a through hole 85 is formed at the machining end 81. Finally, a broaching machine is used to machine the periphery wall of the through hole 85 into a desired shape. However, the aforesaid manufacturing method needs to use a variety of different special processing machines. Not only the process is more complicated, but also the cost will be relatively increased. Therefore, there is still room for improvement.

SUMMARY OF THE INVENTION

It is a primary objective of the present invention to provide a machining tool for a box-end wrench, which can complete processing at one time to simplify processing procedures and reduce costs.

To attain the above objective, the machining tool of the present invention comprises a fixed pillar, a cutting tool unit, and a support member. The cutting tool includes a finishing cutting tool provided with a first teeth portion around an outer surface thereof, a rough cutting tool provided with a second teeth portion around an outer surface thereof, and a punching tool provided with a third teeth portion around an outer surface thereof. The support member is penetrated through the punching tool, the rough cutting tool, and the finishing cutting tool in sequence and detachably mounted to the fixed pillar, such that the support member enables the finishing cutting tool, the rough cutting tool, and the punching tool to be sequentially connected with the fixed pillar in a direction away from the fixed pillar. An outer diameter of the fixed pillar is slightly smaller than a diameter of the finishing cutting tool, and the diameter of the finishing cutting tool is slightly greater than a diameter of the rough cutting tool, and the diameter of the rough cutting tool is slightly greater than a diameter of the punching tool.

It can be seen from the above that the machining tool of the present invention uses the punching tool to punch a partition of a wrench blank to form a through hole, and then uses the rough cutting tool to rough machine a periphery wall of the through hole, and then uses the finishing cutting tool to finish machine the periphery wall of the through hole. In other words, the machining tool of the present invention can complete processing of the through hole at one time to simplify processing procedures and reduce costs. Further, when the support member is detached, the finishing cutting tool, the rough cutting tool, and the punching tool can be repaired or exchanged to enhance convenience of use.

Preferably, the fixed pillar and the finishing cutting tool are separated from each other by a spacer so as to form a tool retreating area therebetween that is penetrated by the support member. In this way, the machining tool is allowed to leave the through hole through the tool retreating area.

Preferably, the finishing cutting tool and the rough cutting tool are separated from each other by a spacer so as to form a chip discharging area therebetween. The rough cutting tool and the punching tool are separated from each other by another spacer so as to form another chip discharging area therebetween. The spacers are penetrated by the support member. In this way, the chips generated during machining can be discharged through the chip discharging areas.

Preferably, the machining tool further comprises two said support members each having a threaded end portion. The fixed pillar has two threaded holes threaded with the threaded end portions of the support members.

It is a secondary objective of the present invention to provide a method of machining the box-end wrench by using the machining tool, which is easy to operate.

To attain the above objective, the method of the present invention comprises following steps: a) providing a wrench blank including a machining end provided with a top concavity, a bottom concavity corresponding to the top concavity, and a partition located between the top concavity and the bottom concavity; b) enabling the machining tool to feed from the top concavity to the bottom concavity to enable the punching tool to punch the partition, such that a through hole with the same tooth profile as the punching tool is formed at the machining end; c) enabling the machining tool to feed continuously to enable the rough cutting tool to rough machine a periphery wall of the through hole; d) enabling the machining tool to feed continuously to enable the finishing cutting tool to finish machine the periphery wall of the through hole; and e) enabling the machining tool to feed continuously to enable the fixed pillar to pass through the through hole, such that the machining tool is separated from the wrench blank.

Preferably, in step b) and step d), the fixed pillar is clamped by a fixture. In step e), the fixture releases the fixed pillar to allow the fixed pillar to pass through the through hole, such that the machining tool is separated from the wrench blank.

Other advantages and features of the present invention will be fully understood by reference to the following specification in conjunction with the accompanying drawings, in which like reference signs denote like components of structure.

DETAILED DESCRIPTION OF THE INVENTION

First of all, it is to be mentioned that the technical features provided by the present invention are unlimited to the specific structure, usage and application thereof described in the detailed description of the invention. It should be understood by those skilled in the related art that all the terms used in the contents of the specification are for illustrative description. The directional terms mentioned in the contents of the specification are also just for illustrative description on the basis of normal usage direction, not intended to limit the claimed scope.

Figure 1:
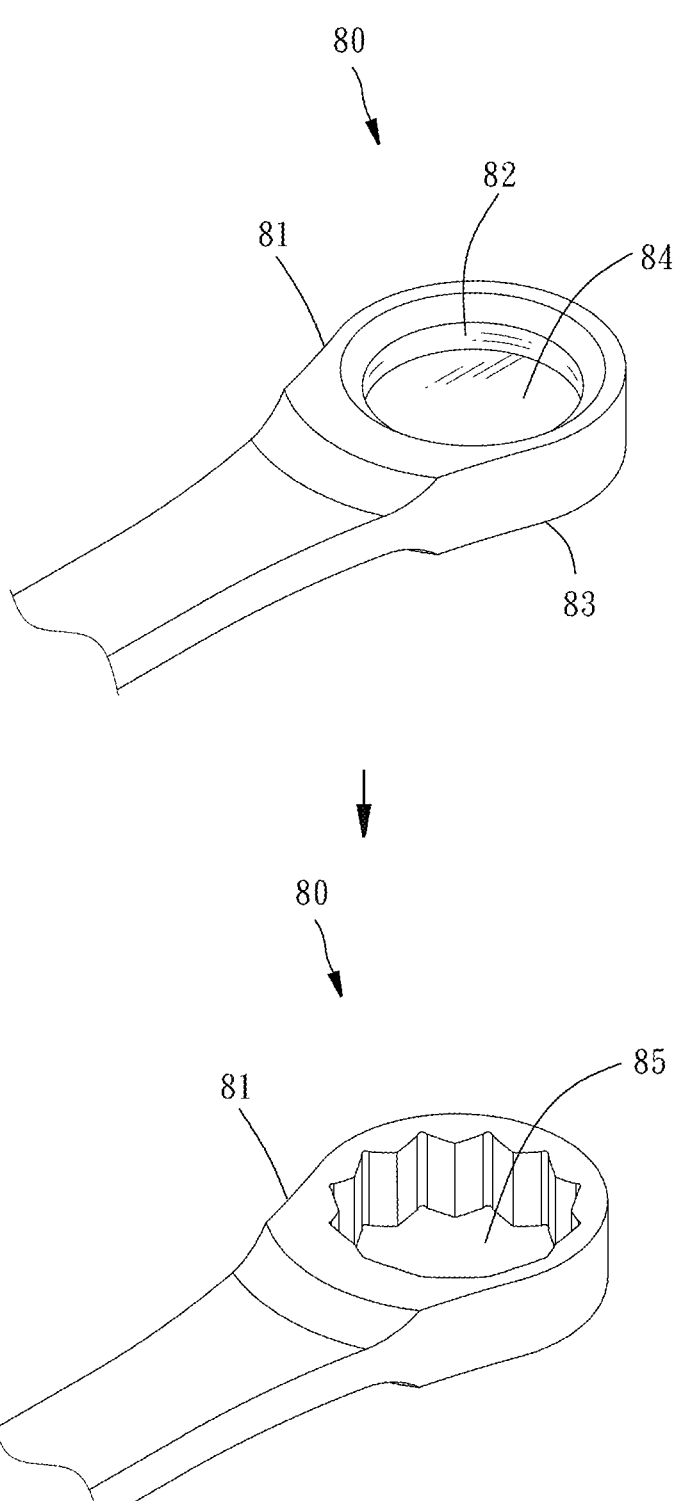
FIG. 1 is a schematic view of machining a box-end wrench of a prior art.
Figure 2:
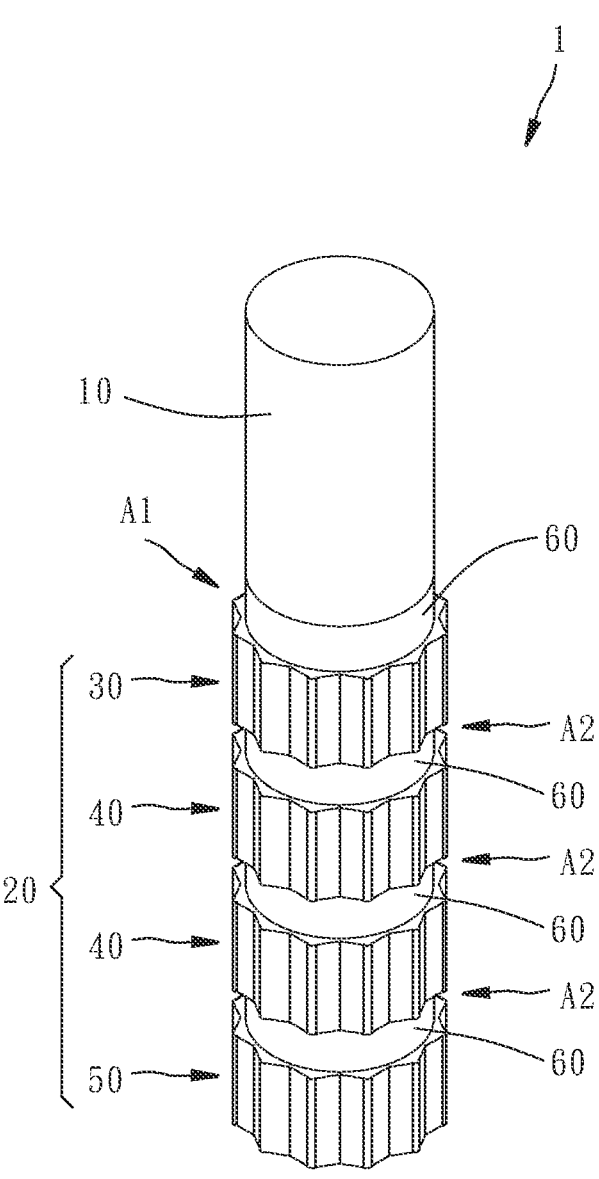
FIG. 2 is a perspective view of a machining tool of the present invention.
Figure 3:
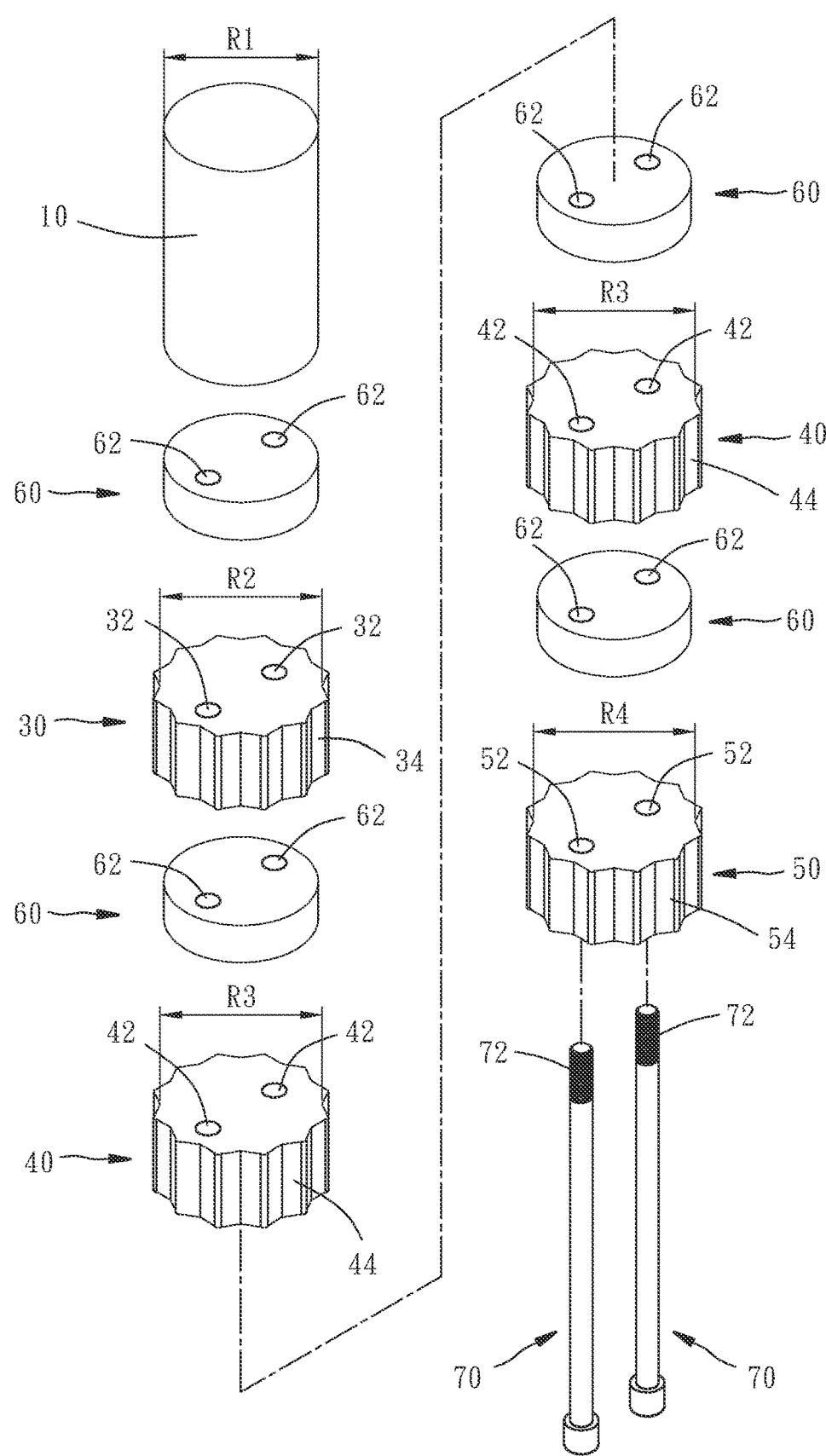
FIG. 3 is an exploded view of the machining tool of the present invention.

Referring to FIGS. 2 and 3, a machining tool 1 of the present invention comprises a fixed pillar 10, a cutting tool unit 20, and two support members 70.

Figures 4, 5:
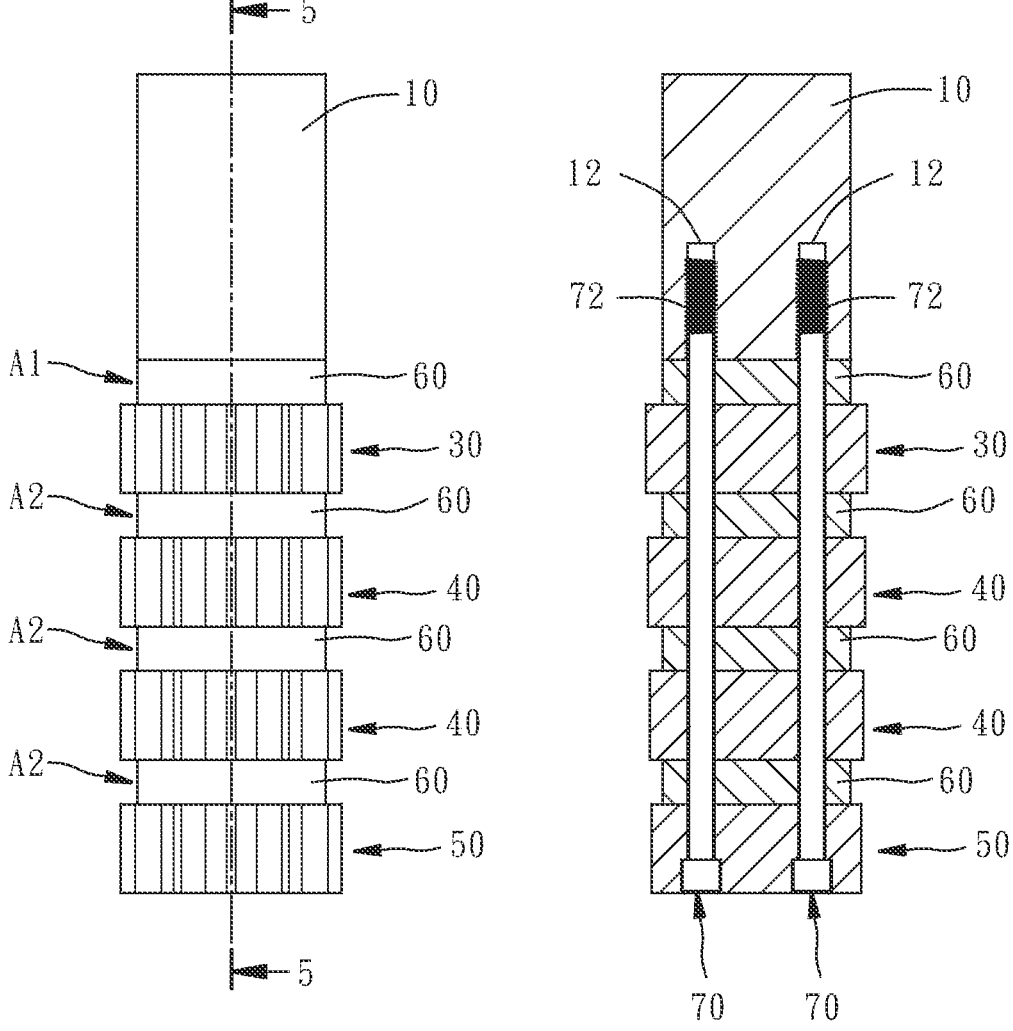
FIG. 4 is a plane view of the machining tool of the present invention.
FIG. 5 is a sectional view taken along line 5-5 of FIG. 4.

The fixed pillar 10 is a cylinder, including two threaded holes 12 arranged in a spaced manner (as shown in FIG. 5).

The cutting tool unit 20 includes a finishing cutting tool 30, two rough cutting tools 40, and a punching tool 50. As shown in FIG. 3, the finishing cutting tool 30 has two first through holes 32, and a first teeth portion 34 is provided around the outer surface of the finishing cutting tool 30. The diameter R2 of the finishing cutting tool 30 is defined between two opposite tooth valleys of the first teeth portion 34. The rough cutting tools 40 each have two second through holes 42, and a second teeth portion 44 is provided around the outer surface of each of the rough cutting tool 40. The diameter R3 of each of the rough cutting tool 40 is defined between two opposite tooth valleys of the second teeth portion 44. The punching tool 50 has two third through holes 52, and a third teeth portion 54 is provided around the outer surface of the punching cutting tool 50. The diameter R4 of the punching tool 50 is defined between two opposite tooth valleys of the third teeth portion 54. In addition, the cutting tool unit 20 further includes four spacers 60. The spacers 60 each have two fourth through holes 62. As shown in FIGS. 2 and 4, in actual assembly, the spacers 60 are disposed between the fixed pillar 10 and the finishing cutting tool 30, the finishing cutting tool 30 and the rough cutting tool 40, the two rough cutting tools 40, and the rough cutting tool 40 and the punching tool 50, such that a tool retreating area A1 is formed between the fixed pillar 10 and the finishing cutting tool 30 on one hand, and on the other hand, chip discharging areas A2 are formed between the finishing cutting tool 30 and the rough cutting tool 40, the two rough cutting tools 40, and the rough cutting tool 40 and the punching tool 50, respectively.

What needs to be added here is that the profiles of the finishing cutting tool 30, the rough cutting tool 40, and the punching tool 50 can be different according to actual needs, so it is not limited here. The rough cutting tool 40 is not limited to two in number, and can also be decreased to one or increased to two or more according to actual needs.

As shown in FIGS. 3 and 5, the support members 70 each have a threaded end portion 72. In actual assembly, the support members 70 pass through the third through holes 52 of the punching tool 50, the fourth holes 62 of the spacer 60, the second through holes 42 of the rough cutting tool 40, the fourth holes 62 of the spacer 60, the second through holes 42 of the rough cutting tool 40, the fourth holes 62 of the spacer 60, the first through holes 32 of the finishing cutting tool 30, and the fourth holes 62 of the spacer 60 in sequence from bottom to top, and further, the threaded end portions 72 of the support members 70 are threaded with the threaded holes 12 of the fixed pillar 10, such that the punching tool 50, the rough cutting tools 40, the finishing cutting tool 30, and the spacers 60 can be firmly fixed together and arranged sequentially in a direction away from the fixed pillar 10.

Figure 6:
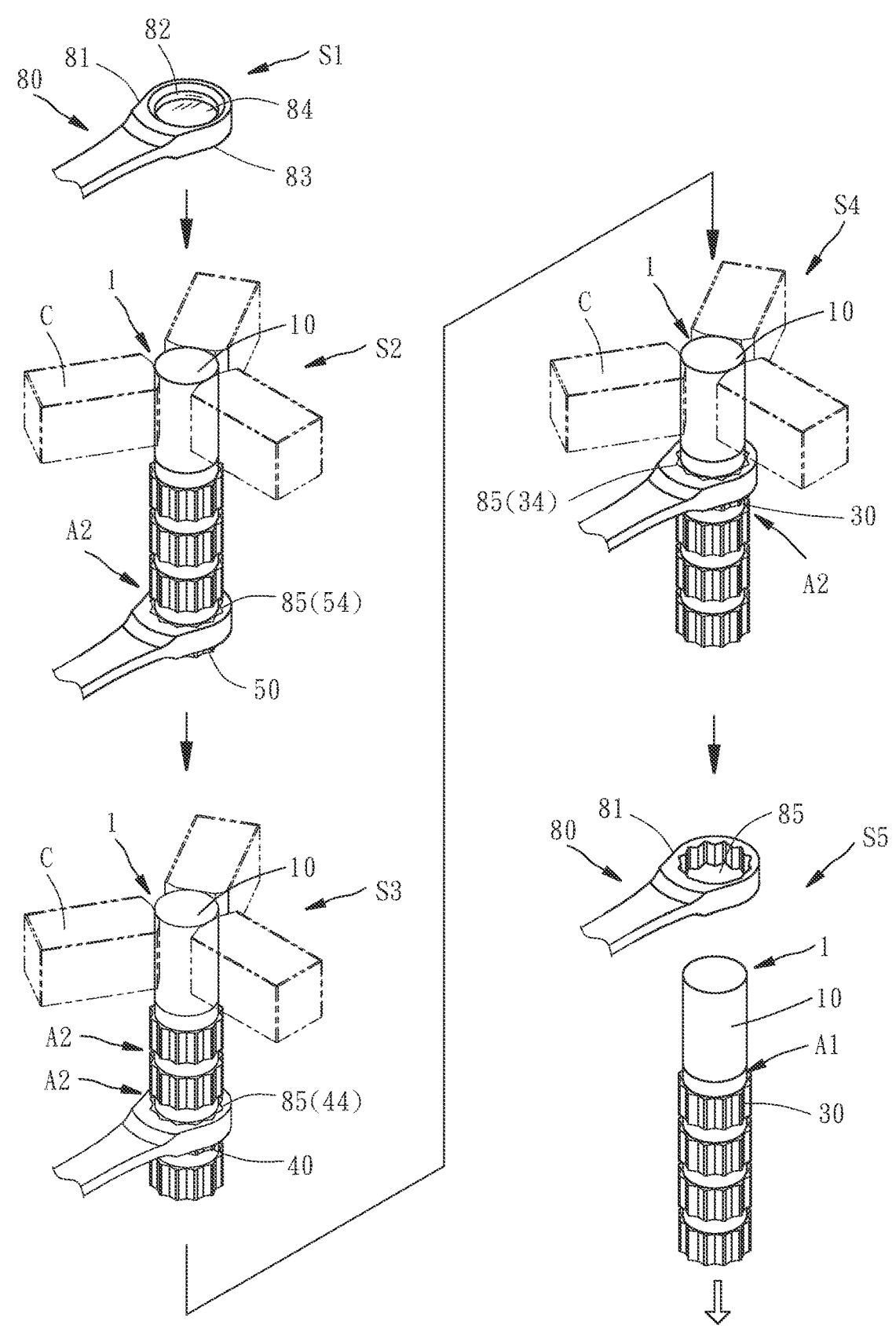
FIG. 6 is a flow chart of a method of machining the box-end wrench of the present invention.

The structural features of the machining tool 1 of the present invention are described above. The method of machining a box-end wrench by using the machining tool 1 of the present invention will be further described hereinafter. Referring to FIG. 6, the method includes the following steps.

a) As the step S1 shown in FIG. 6, provide a wrench blank 80. The wrench blank 80 includes a machining end 81 provided with a top concavity 82, a bottom concavity 83 corresponding to the top concavity 82, and a partition 84 located between the top concavity 82 and the bottom concavity 83.

In this step, the wrench blank 80 is usually made by forging. Because the method of manufacturing the wrench blank 80 is conventional and not the key point of the invention, the detailed configuration will not be repeatedly mentioned hereunder.

b) As the step S2 shown in FIG. 6, enable the machining tool 1 to feed from the top concavity 82 to the bottom concavity 83 to enable the punching tool 50 to punch the partition 84, such that a through hole 85 with the same tooth profile as the punching tool 50 is formed at the machining end 81.

In this step, the fixed pillar 10 of the machining tool 1 of the present invention is clamped by a fixture C of a punching machine (not shown), and then the machining tool 1 of the present invention is driven by the punching machine to feed downwards from the top concavity 82 to the bottom concavity 83, such that the punching tool 50 punches the partition 84 and cuts it through the third teeth portion 54 to form the through hole 85 through the top and bottom concavities 82, 83 at the machining end 81. The through hole 85 has the same tooth profile as that of the third teeth portion 54 of the punching tool 50, and the inner diameter of the through hole 85 is equal to the diameter R4 of the punching tool 50 as shown in FIG. 3; that is to say, the inner diameter of the through hole 85 is defined between two opposite inner tooth peaks of the periphery wall of the through hole 85. Further, the chips generated during punching and cutting will be discharged through the chip discharging areas A2.

c) As the step S3 shown in FIG. 6, enable the machining tool 1 to feed continuously to enable the rough cutting tool 40 to rough machine the periphery wall of the through hole 85.

In this step, the machining tool 1 of the present invention is driven by the punching machine to feed downwards continuously. Since the diameter R3 of the rough cutting tool 40 is slightly greater than the diameter R4 of the punching tool 50 (as shown in FIG. 3), the rough cutting tool 40 uses the second teeth portion 44 to rough machine the periphery wall of the through hole 85, such that the periphery wall of the through hole 85 has the same tooth profile as that of the second teeth portion 44, and the inner diameter of the through hole 85 is equal to the diameter R3 of the rough machining tool 40 as shown in FIG. 3; that is to say, the inner diameter of the through hole 85 is defined between two opposite inner tooth peaks of the periphery wall of the through hole 85. Further, the chips generated during rough machining will be discharged through the chip discharging areas A2.

d) As the step S4 shown in FIG. 6, enable the machining tool 1 to feed continuously to enable the finishing cutting tool 30 to finish machine the periphery wall of the through hole 85.

In this step, the machining tool 1 of the present invention is driven by the punching machine to feed downwards continuously. Since the diameter R2 of the finishing cutting tool 30 is slightly greater than the diameter R3 of the rough machining tool 40 (as shown in FIG. 3), the finishing cutting tool 30 uses the first teeth portion 34 to finish machine the periphery wall of the through hole 85, such that the periphery wall of the through hole 85 has the same tooth profile as that of the first teeth portion 34, and the inner diameter of the through hole 85 is equal to the diameter R2 of the finish machining tool 30 as shown in FIG. 3; that is to say, the inner diameter of the through hole 85 is defined between two opposite inner tooth peaks of the periphery wall of the through hole 85. Further, the chips generated during finish machining will be discharged through the chip discharging areas A2.

e) As the step S5 shown in FIG. 6, enable the machining tool 1 to feed continuously to enable the fixed pillar 10 to pass through the through hole 85, such that the machining tool 1 is separated from the wrench blank 80.

In this step, the machining tool 1 of the present invention is driven by the punching machine to feed downwards continuously until the tool retreating area A1 corresponds to the through hole 85. At this time, an operator releases the fixture C so that the fixed pillar 10 is not clamped by the fixture C, as shown in FIG. 3. Since the outer diameter R1 of the fixed pillar 10 is slightly smaller than the inner diameter of the through hole 85 (i.e., the diameter R2 of the finish cutting tool 30), the operator can easily hold the cutting tool unit 20 by hands and pull it down to make the fixed pillar 10 pass through the through hole 85 smoothly. As a result, the machining tool 1 of the present is separated from the wrench blank 80 to complete machining of the through hole 85.

As indicated above, the machining tool 1 of the present invention can complete processing of the through hole 85 at one time without using a variety of different special processing machines to simplify processing procedures and reduce costs. In addition, if the cutting tool unit 20 is damaged, as long as the support members 70 are dissembled, the finish cutting tool 30, the rough cutting tools 40, and the punching tool 50 can be repaired or exchanged to enhance convenience of use.

What is claimed is:

1. A machining tool for a box-end wrench, comprising:
a fixed pillar;
a cutting tool unit including a finishing cutting tool provided with a first teeth portion around an outer surface thereof, a rough cutting tool provided with a second teeth portion around an outer surface thereof, and a punching tool provided with a third teeth portion around an outer surface thereof; and
a support member passing through the punching tool, the rough cutting tool, and the finishing cutting tool in sequence and detachably mounted to the fixed pillar, the support member enabling the finishing cutting tool, the rough cutting tool, and the punching tool to be sequentially connected with the fixed pillar in a direction away from the fixed pillar;
wherein the finishing cutting tool has a diameter defined between two opposite tooth valleys of the first teeth portion; the rough cutting tool has a diameter defined between two opposite tooth valleys of the second teeth portion; and the punching tool has a diameter defined between two opposite tooth valleys of the third teeth portion; an outer diameter of the fixed pillar is slightly smaller than the diameter of the finishing cutting tool, and the diameter of the finishing cutting tool is slightly greater than the diameter of the rough cutting tool, and the diameter of the rough cutting tool is slightly greater than the diameter of the punching tool.

2. The machining tool as claimed in claim 1, wherein the fixed pillar and the finishing cutting tool are separated from each other by a spacer so as to form a tool retreating area therebetween; the support member passes through the spacer.

3. The machining tool as claimed in claim 1, wherein the finishing cutting tool and the rough cutting tool are separated from each other by a spacer so as to form a chip discharging area therebetween; the rough cutting tool and the punching tool are separated from each other by another spacer so as to form another chip discharging area therebetween; the support member passes through the spacers.

4. The machining tool as claimed in claim 1, comprising two support members each having a threaded end portion; the fixed pillar has two threaded holes threaded with the threaded end portions of the support members.

5. A method of machining the box-end wrench by using the machining tool as claimed in claim 1, comprising steps of:
a) providing a wrench blank, the wrench blank including a machining end provided with a top concavity, a bottom concavity corresponding to the top concavity, and a partition located between the top concavity and the bottom concavity;
b) enabling the machining tool to feed from the top concavity to the bottom concavity to enable the punching tool to punch the partition, such that a through hole with the same tooth profile as the punching tool is formed at the machining end;
c) enabling the machining tool to feed continuously to enable the rough cutting tool to rough machine a periphery wall of the through hole;
d) enabling the machining tool to feed continuously to enable the finishing cutting tool to finish machine the periphery wall of the through hole; and
e) enabling the machining tool to feed continuously to enable the fixed pillar to pass through the through hole, such that the machining tool is separated from the wrench blank.

6. The method as claimed in claim 5, wherein in step b) and step d), the fixed pillar is clamped by a fixture; in step e), the fixture releases the fixed pillar to allow the fixed pillar to pass through the through hole, such that the machining tool is separated from the wrench blank.

* * * * *